United States Patent [19]

Ngo et al.

[11] Patent Number: 4,709,316
[45] Date of Patent: Nov. 24, 1987

[54] SINGLE-ENDED DC-TO-DC CONVERTER WITH LOSSLESS SWITCHING

[75] Inventors: Khai D. T. Ngo, Schenectady; William A. Peterson, Vestal, both of N.Y.

[73] Assignee: General Electric Company, Schenectady, N.Y.

[21] Appl. No.: 813,810

[22] Filed: Dec. 27, 1985

[51] Int. Cl.[4] .......................................... H02M 3/335
[52] U.S. Cl. .......................................... 363/21; 363/97
[58] Field of Search .................. 363/20, 21, 27, 28, 363/97; 323/282

[56] References Cited

U.S. PATENT DOCUMENTS

| | | | |
|---|---|---|---|
| 3,573,598 | 4/1971 | Clarke | 363/27 |
| 4,318,164 | 3/1982 | Onodera et al. | 363/21 |
| 4,383,292 | 5/1983 | Onodera et al. | 363/21 |
| 4,401,902 | 8/1983 | Onodera et al. | 307/415 |
| 4,415,959 | 11/1983 | Vinciarelli | 363/21 |
| 4,441,146 | 4/1984 | Vinciarelli | 363/20 |
| 4,443,839 | 4/1984 | Onodera et al. | 363/20 |
| 4,559,590 | 12/1985 | Davidson | 363/21 |
| 4,616,300 | 10/1986 | Santelmann | 363/61 |

FOREIGN PATENT DOCUMENTS

| | | | |
|---|---|---|---|
| 3241738 | 5/1984 | Fed. Rep. of Germany | 323/282 |
| 2138224 | 10/1984 | United Kingdom | 363/21 |

OTHER PUBLICATIONS

Nazario et al, "Converter Regulation at the Primary", IBM Tech. Discl. Bul., vol. 27, No. 1A, pp. 109-114, Jun. 1984.

*Primary Examiner*—William H. Beha, Jr.
*Attorney, Agent, or Firm*—Marvin Snyder; James C. Davis, Jr.

[57] ABSTRACT

The leakage inductance of the isolation transformer of a single-ended DC-to-DC converter resonates with a resonant capacitor connected in series with the transformer secondary to provide substantially zero current in the switching transistor during turn-on and turn-off. The overall transistor current stress is low since it is bounded by the sum of average input current and average output current. These factors allow the converter to be operated at high frequencies for improved performance.

7 Claims, 5 Drawing Figures

SINGLE-ENDED DC-TO-DC CONVERTER WITH LOSSLESS SWITCHING

BACKGROUND OF THE INVENTION

The present invention relates in general to DC-to-DC switching converter power supplies and more specifically to a converter circuit having substantially zero current in the switching transistor during turn-on and turn-off.

Many types of DC-to-DC converters are known in the art for converting a first DC voltage to a second, regulated DC voltage. Typically, the first DC voltage is converted to an AC voltage (or DC pulses) by a switching transistor or transistors. The AC voltage is then reconverted to a desired DC output voltage. Feedback of the output voltage is used to control the duty cycle or the frequency of the AC voltage produced by the transistor(s) so that the desired voltage regulation is achieved.

Switching converters are known to have a higher efficiency than other types of power supplies such as series-regulated power supplies. However, the efficiency of switching converters has been limited by losses in the switching transistor(s) during turn-on and turn-off, particularly in pulse-width modulated (PWM) converters since the switching transistor(s) must then simultaneously withstand high current and high voltage during both turn-on and turn-off. It is known that lossless switching is possible if the transistor is turned on or off at zero current.

Resonant converters use a variable frequency AC voltage for regulating the DC output voltage. In resonant converters it is possible to have either lossless turn-on or lossless turn-off, but not both. Furthermore, current flow in the transistor(s) of a resonant converter is high, thus putting a high current stress on the transistor(s). This requires costly transistors with a high current rating.

By increasing the switching frequency, a converter having smaller size, lower weight, lower cost and faster response can be obtained. However, the higher frequency switching aggravates transistor losses and degrades efficiency.

Accordingly, it is a principal object of the present invention to provide a DC-to-DC converter having substantially no switching losses in the switching transistor.

It is another object to provide a DC-to-DC converter with low current stress on the switching transistor.

It is a further object to provide a single-ended converter circuit adapted for lossless switching operation even at high frequencies.

SUMMARY OF THE INVENTION

These and other objects are achieved in a DC-to-DC converter comprising a transformer, switching means, a resonance capacitor and an uncontrolled rectifier. The transformer has a primary winding and a secondary winding. The primary winding is adapted to be coupled to a DC power source. The switching means is connected in series with the primary winding for selectively providing current flow through the primary winding.

The resonance capacitor is connected in series with the secondary winding and is adapted to have a voltage determined by resonance between the resonance capacitor and the leakage inductance of the transformer. The uncontrolled rectifier is connected across the combination of the secondary winding and the resonance capacitor. The uncontrolled rectifier is oriented so as to be conductive when the resonance capacitor is charged by the magnetizing current of the transformer and to be nonconductive when the resonance capacitor discharges.

The converter may further comprise a DC output filter including a filter inductor and a filter capacitor connected in series across the uncontrolled rectifier, the converter output being taken across the filter capacitor. It may also include a resonance inductor connected in series with the resonance capacitor.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

DETAILED DESCRIPTION OF THE INVENTION

Figure 1:
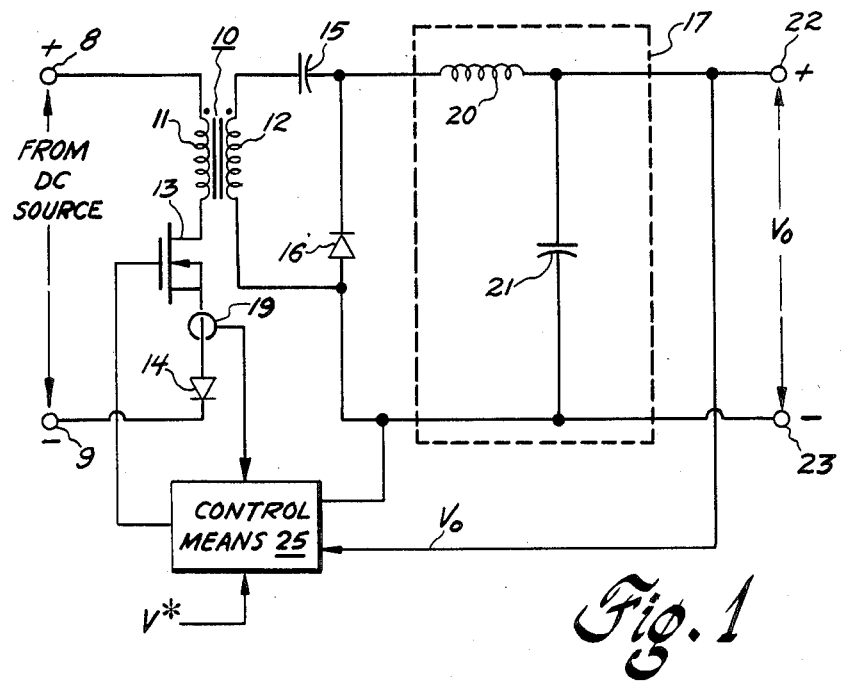
FIG. 1 is a schematic diagram of one embodiment of the DC-to-DC converter of the invention.

A first embodiment of the invention is shown in FIG. 1. A pair of input terminals 8 and 9 are adapted to be coupled to the positive and negative terminals, respectively, of a DC source (not shown). A transformer 10 has a primary winding 11 magnetically coupled to a secondary winding 12. Primary winding 11 is connected in series with a switching device 13 and a diode 14 between terminals 8 and 9. Switching device 13 is shown as a field-effect transistor (FET), although other switching devices such as a bipolar transistor, a thyristor or a silicon control rectifier (SCR) could alternatively be used.

Secondary winding 12 is connected in series with a capacitor 15. Connected across secondary winding 12 and capacitor 15 are a diode 16 and an output filter 17. Diode 16 has its anode connected to one side of secondary winding 12 and has its cathode connected to capacitor 15. Output filter 17 includes a filter inductor 20 connected between capacitor 15 and an output terminal 22. Output filter 17 also includes a filter capacitor 21 connected between output terminal 22 and an output terminal 23.

A control means 25 is coupled to output terminals 22 and 23 and to the gate of FET 13. Control means 25 also receives a voltage command signal V* supplied externally and a current signal from a current sensor 19 coupled to FET 13.

The circuit of FIG. 1 is a single-ended DC-to-DC converter. FET 13 is turned on and off to provide DC pulses to primary winding 11. Diode 14 isolates negative voltage from FET 13 after FET 13 turns off.

The DC pulses in primary winding 11 produce an alternating voltage across the series combination of secondary winding and capacitor 15. The alternating voltage is rectified by diode 16 and smoothed by output filter 17. The output voltage $V_o$, which is provided at terminal 22 and referenced to terminal 23, is provided to control means 25. FET 13 is turned on and off by control means 25 so as to conform output voltage $V_o$ to its commanded level as described below.

Figure 3:
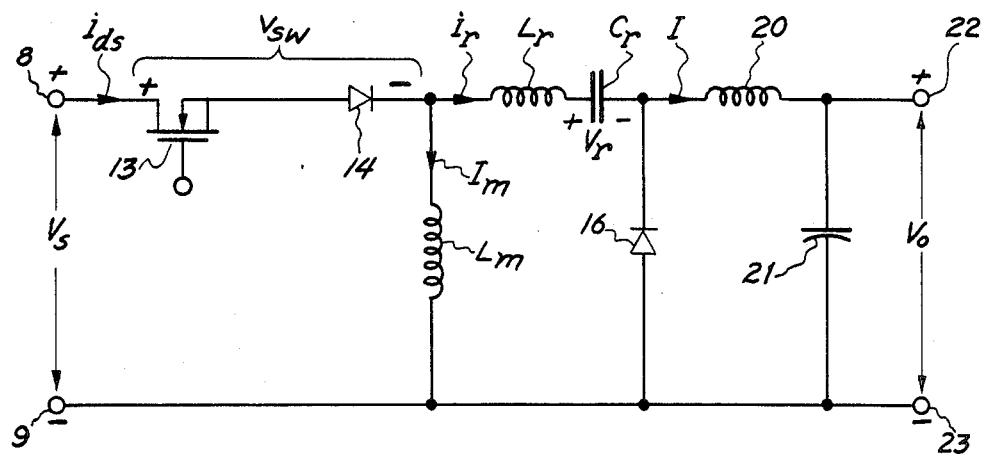
FIG. 3 is a diagram of an equivalent circuit, albeit implementable in discrete components, useful in explaining the circuit of FIG. 1.

The operation of the circuit in FIG. 1 will be described in greater detail with reference to the circuit model of FIG. 3. In FIG. 3, transformer 10 is replaced by its magnetizing inductance $L_m$ and its leakage inductance $L_r$. For purposes of the present invention, the leakage inductance $L_r$ can be small with no attempt to introduce any extra leakage inductance in the transformer if the converter is operated at high frequencies in the range of several kilohertz. The resonant capacitance $C_r$ of FIG. 3 equals the capacitance of capacitor 15 in FIG. 1.

Operation of FET 13 causes resonance between leakage inductance $L_r$ and resonant capacitance $C_r$. Leakage inductance $L_r$ is much smaller than both the magnetizing inductance $L_m$ and the inductance of filter inductor 20 and the resonant capacitance $C_r$ is much smaller than the capacitance of filter capacitor 21.

Under a steady-state output condition of the converter, filter inductor 20 carries a DC load current I. Magnetizing inductance $L_m$ carries a magnetizing current $I_m$ and leakage inductance $L_r$ carries a resonant current $i_r$. During steady state operation, the voltage across filter capacitor 21 (i.e. $V_o$), filter inductor current I and magnetizing current $I_m$ are substantially constant with a small amount of switching ripple because their time constants are much longer than a switching period. In contrast, resonant current $i_r$ and resonant voltage $V_r$ are alternating, with their resonant frequency higher than, but comparable to, the switching frequency.

FET 13 carries a drain current $i_{ds}$. A voltage $V_{sw}$ is across the combination of FET 13 and diode 14. Drain current $i_{ds}$ of FET 13 is equal to the sum of magnetizing current $I_m$ and resonant current $i_r$. Diode 16 prevents resonant current $i_r$ from exceeding load current I. Therefore drain current $i_{ds}$ is always less than or equal to the sum of the load current I and the magnetizing current $I_m$. Therefore, current stress in FET 13 is low.

Figure 4:
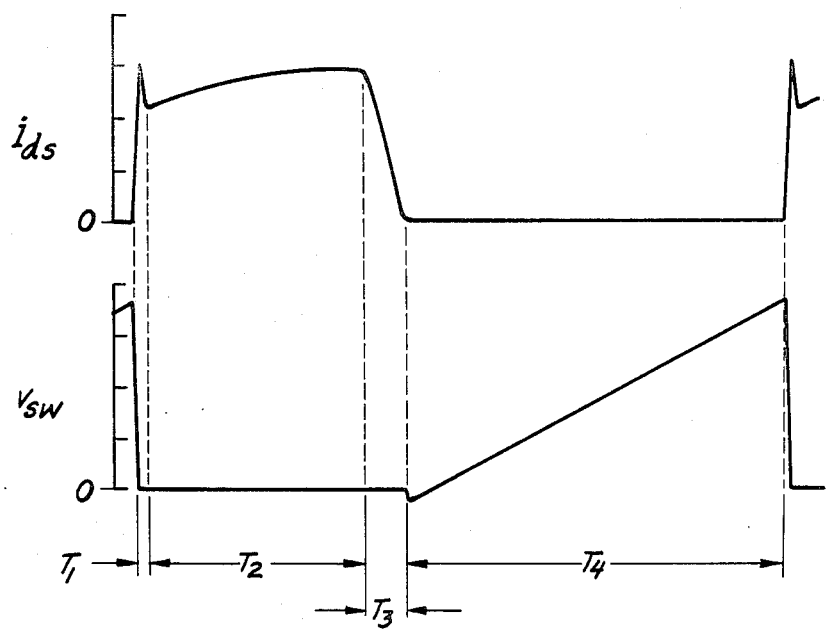
FIG. 4 is a waveform diagram illustrating operation of the transistor of FIG. 1.

Waveforms of the drain current $i_{ds}$ and the switch voltage $V_{sw}$ are shown in FIG. 4. Immediately before the beginning of a switching cycle of FET 13, FET 13 is off ($i_{ds}$ is zero) and diode 16 is conducting. When a switching cycle begins, a gate signal is applied to the gate of FET 13. Since drain current $i_{ds}$ is the sum of two inductive currents, specifically $i_r$ and $I_m$, it is inductive and cannot change instantaneously. Thus, drain current $i_{ds}$ stays at zero while voltage $V_{sw}$ falls to near zero and then $i_{ds}$ rises to its maximum value of $I+I_m$. Since drain current $i_{ds}$ is zero during the turn-on transient, turn-on is lossless.

During time period $T_1$ in FIG. 4, resonant current $i_r$ resonates toward load current I, thus causing drain current $i_{ds}$ to rise. During time period $T_2$, resonant current $i_r$ is clamped at the value of load current I since diode 16 is nonconductive while resonant capacitance $C_r$ is discharged by load current I. Likewise, drain current $i_{ds}$ is clamped at $I+I_m$ during the discharge of resonant capacitance $C_r$.

At the end of time period $T_2$, resonant capacitance $C_r$ has discharged and diode 16 resumes conduction. During time period $T_3$, resonant current $i_r$ changes direction and resonates toward a value of $-I_m$, thus causing drain current $i_{ds}$ to decrease. Diode 14 blocks reverse current and FET 13 is turned off when drain current $i_{ds}$ reaches zero. Therefore, turn off of FET 13 is also lossless.

During time period $T_4$, FET voltage $V_{sw}$ rises linearly and the magnetizing current $I_m$ charges the resonant capacitance $C_r$ with a polarity opposite the polarity of $V_r$ shown in FIG. 3 (diode 16 conducts load current I and magnetizing current $I_m$).

A switching period equals the sum of time periods $T_1$ to $T_4$. Thus, $T_4$ ends when FET 13 is again turned on. The output voltage $V_o$ is determined by the frequency of switching cycles. A higher frequency of switching cycles gives a higher output voltage since more energy is transferred to the output filter.

Returning now to FIG. 1, the operation of control means 25 will be described. Control means 25 drives FET 13 in a manner to provide a desired output voltage $V_o$ across output terminals 22 and 23. Control means 25 can be adapted to operate FET 13 at almost any nonzero frequency below the resonant frequency of the leakage inductance of transformer 10 and the capacitance of capacitor 15. In a preferred embodiment, using the natural leakage inductance of transformer 10 and a capacitor 15 of relatively small capacitance, the switching frequency of FET 13 may be about 20 kilohertz and higher for a 50 watt supply and about 600 kilohertz and higher for a 250 watt supply.

Figure 5:
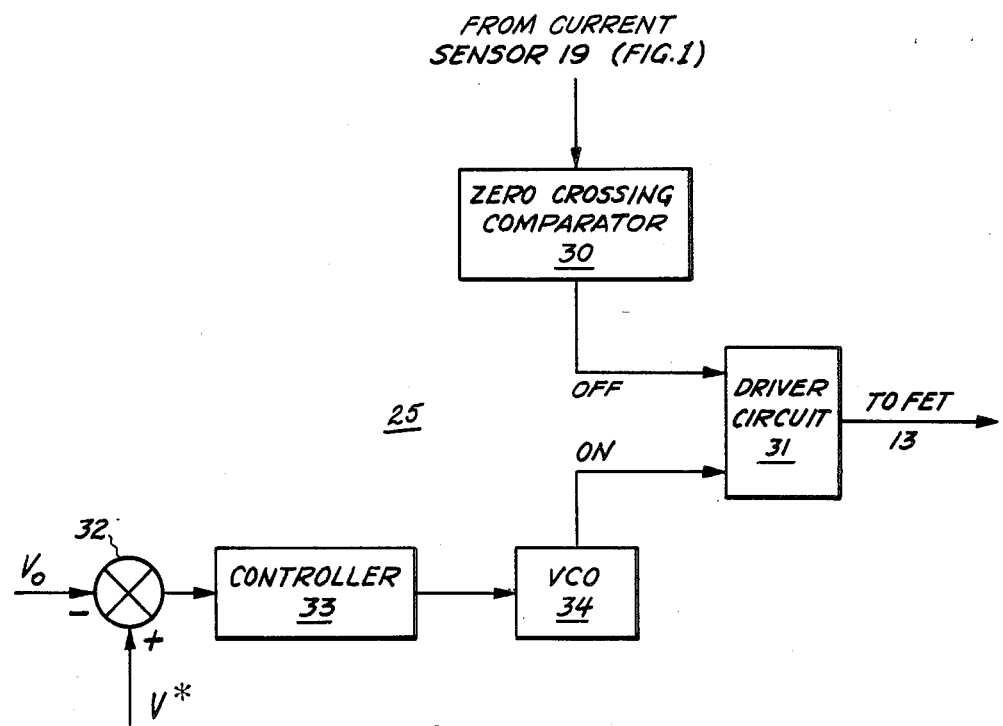
FIG. 5 is a block diagram of one embodiment of the control means of FIG. 1.

FIG. 5 shows apparatus for implementing control means 25 including a summer 32 for comparing output voltage $V_o$ and voltage command $V^*$. The summer output is coupled to the input of a proportional and integral controller 33, the output of which controls a voltage-controlled oscillator (VCO) 34. Pulses from voltage-controlled oscillator 34 cause a driver circuit 31 to provide a turn-on signal to FET 13.

FET current $i_{ds}$ is sensed by current sensor 19 and is compared with zero (ground) by a zero crossing comparator 30. At a zero crossing, comparator 30 signals driver circuit 31 to turn off FET 13.

Figure 2:
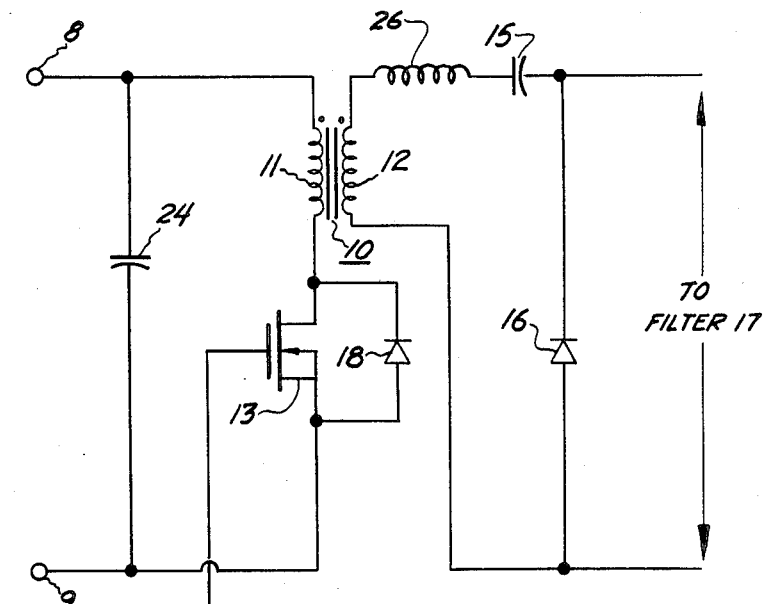
FIG. 2 is a schematic diagram of another embodiment of the DC-to-DC converter of the invention.

Another embodiment of the present invention is shown in FIG. 2. In this embodiment a diode 18 is connected in inverse-parallel with FET 13. A source capacitor 24 is connected across terminals 8 and 9. The connection of inverse-parallel diode 18 allows bidirectional current to flow in primary winding 11. Capacitor 24 provides storage of energy regenerated during the conduction of diode 18. Diode 18 should be a fast diode to prevent ringing during the switching transients of FET 13.

FIG. 2 also shows the alternative connection of an external resonance inductor 26 in series with resonance capacitor 15, which can be included to supplement or replace the leakage inductance of the transformer.

It should further be noted that the present invention is not limited to the use of a transformer. Thus, the circuit of FIG. 3 could be built with discrete components connected as shown. This converter could also be controlled by the control circuit of FIG. 5.

The foregoing describes a DC-to-DC converter having substantially no switching losses in the switching transistor. The converter has low current stress on the switching transistor thus allowing a low current rating for the transistor. The single-ended converter circuit provides lossless switching operation at very high frequencies.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A DC-to-DC converter comprising:
   a transformer having a primary winding and a secondary winding;
   a resonance capacitor connected in series with said secondary winding, said resonance capacitor adapted to have a voltage thereacross determined by resonance between said resonance capacitor and the leakage inductance of said transformer;
   switching means connected in series with said primary winding and adapted to be coupled across a DC power source, said switching means selectively conducting or blocking current flow through said primary winding at a controllably variable frequency below the frequency of resonant voltage across said resonance capacitor when the series combination of said switching means and said primary winding is coupled across said DC power source;
   a DC output filter;
   control means coupled to said switching means for periodically turing on said switching means and for turning off said switching means when the current flowing in said switching means crosses zero, said control means being coupled to said DC output filter for regulating the output voltage of said converter in response to a commanded voltage by varying the frequency at which said switching means is turned on so as to conform said output voltage to said command voltage; and
   an uncontrolled rectifier connected across the combination of said secondary winding and said resonance capacitor, said uncontrolled rectifier oriented so as to be conductive when said resonance capacitor is charged by the magnetizing current of said transformer and to the nonconductive when said resonance capacitor discharges, said DC output filter including a filter inductor and a filter capacitor connected in series across said uncontrolled rectifier, the output of said converter being taken across said filter capacitor.

2. The converter of claim 1 wherein said control means is adapted to switch said switching means with a frequency range of about 20 kilohertz and higher.

3. The converter of claim 1 wherein said control means is adapted to switch said switching means within a frequency range of about 600 kilohertz and higher.

4. The converter of claim 1 wherein said switching means is comprised of an FET and a diode connected in series, said diode oriented so as to conduct unidirectional current from said DC power source.

5. The converter of claim 1 wherein said switching means is comprised of an FET and a diode connected in inverse-parallel, said diode oriented so as to conduct current flowing from said primary winding back to said DC power source.

6. A DC-to-DC converter comprising:
   a transformer having a primary winding and a secondary winding;
   a resonance capacitor connected in series with said secondary winding, said resonance capacitor adapted to have a voltage thereacross determined by resonance between said resonance capacitor and the leakage inductance of said transformer;
   switching means connected in series with said primary winding and adapted to be coupled across a DC power source, said switching means selectively conducting or blocking current flow through said primary winding at a controllably variable frequency below the frequency of resonant voltage across said resonance capacitor when the series combination of said switching means and said primary winding is coupled across said DC power source, said switching means comprising an FET and a diode connected in inverse-parallel said diode oriented so as to conduct current flowing from said primary winding back to said DC power source;
   a source capacitor connected across the series combination of said primary winding and said switching means;
   an uncontrolled rectifier connected across the combination of said secondary winding and said resonance capacitor, said uncontrolled rectifier oriented so as to be conductive when said resonance capacitor is charged by the magnetizing current of said transformer and to be nonconductive when said resonance capacitor discharges; and
   output means coupled across said uncontrolled rectifier for supplying DC power whenever a load is coupled to said output means.

7. A DC-toDC converter comprising:
   a transformer having a primary winding and a secondary winding;
   a resonance capacitor connected in series with said secondary winding, said resonance capacitor adapted to have a voltage thereacross determined by resonance between said resonance capacitor and the leakage inductance of said transformer;
   switching means connected in series with said primary winding and adapted to be coupled across a DC power source, said switching means selectively conducting or blocking current flow through said primary winding at a controlling variable frequency below the frequency of resonant voltage across said resonance capacitor when the series combination of said switching means and said primary winding is coupled across said DC power source, said switching means comprising an FET and a diode connected in series, said diode oriented so as to conduct unidirectional current from said DC power source;
   an uncontrolled rectifier connected across the combination of said secondary winding and said resonance capacitor, said uncontrolled rectifier oriented so as to be conductive when said resonance capacitor is charged by the magnetizing current of said transformer and to be nonconductive when said resonance capacitor discharges;
   output means coupled across said uncontrolled rectifier for supplying DC power whenever a load is coupled to said output means; and
   control means coupled to said switching means for periodically turning on said switching means and for turning off said switching means when the current flowing in said switching means crosses zero.

* * * * *